O. OSTER.
HOT WATER HEATING APPARATUS.
APPLICATION FILED JULY 31, 1908.

931,337.

Patented Aug. 17, 1909.
2 SHEETS—SHEET 1.

Witnesses
A. J. McCauley
George Ladson

Inventor:
Otto Oster
by Bakewell Cornwall Attys.

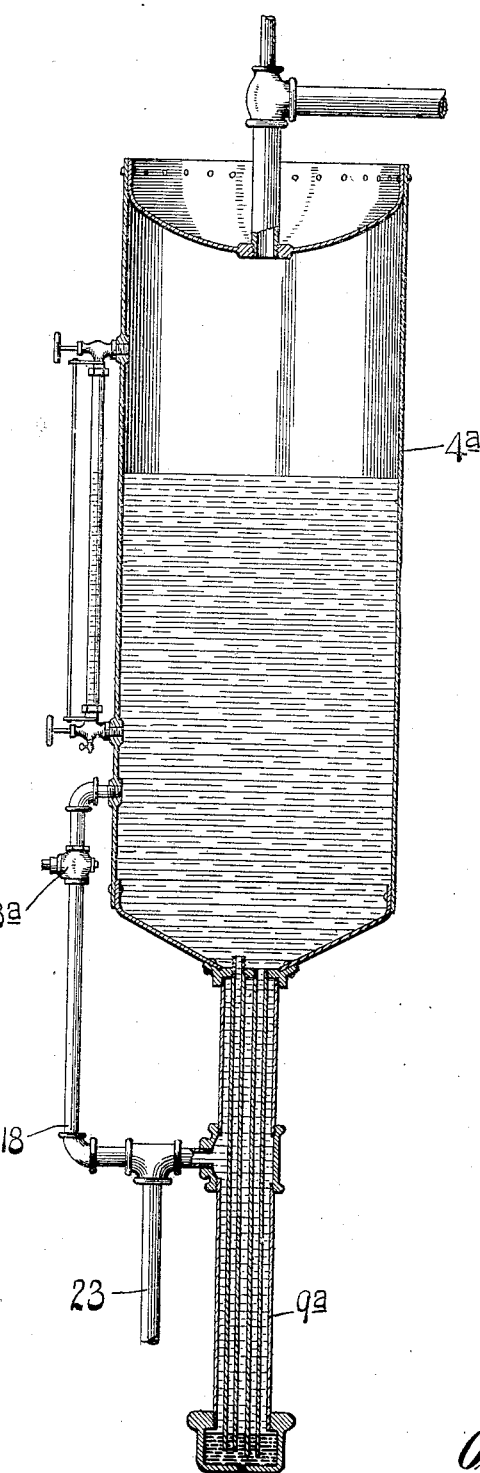

UNITED STATES PATENT OFFICE.

OTTO OSTER, OF WELLSTON, MISSOURI.

HOT-WATER HEATING APPARATUS.

No. 931,337. Specification of Letters Patent. Patented Aug. 17, 1909.

Application filed July 31, 1908. Serial No. 446,251.

*To all whom it may concern:*

Be it known that I, OTTO OSTER, a citizen of the United States, residing at Wellston, St. Louis county, Missouri, have invented a certain new and useful Improvement in Hot-Water Heating Apparatus, of which the following is a full, clear, and exact description, such as will enable others skilled in the art to which it appertains to make and use the same, reference being had to the accompanying drawings, forming part of this specification, in which—

Figure 1:
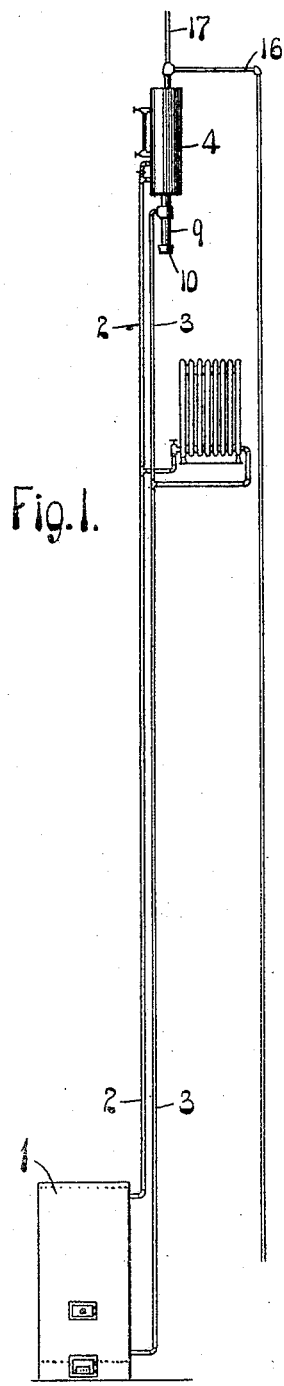
Figure 2:
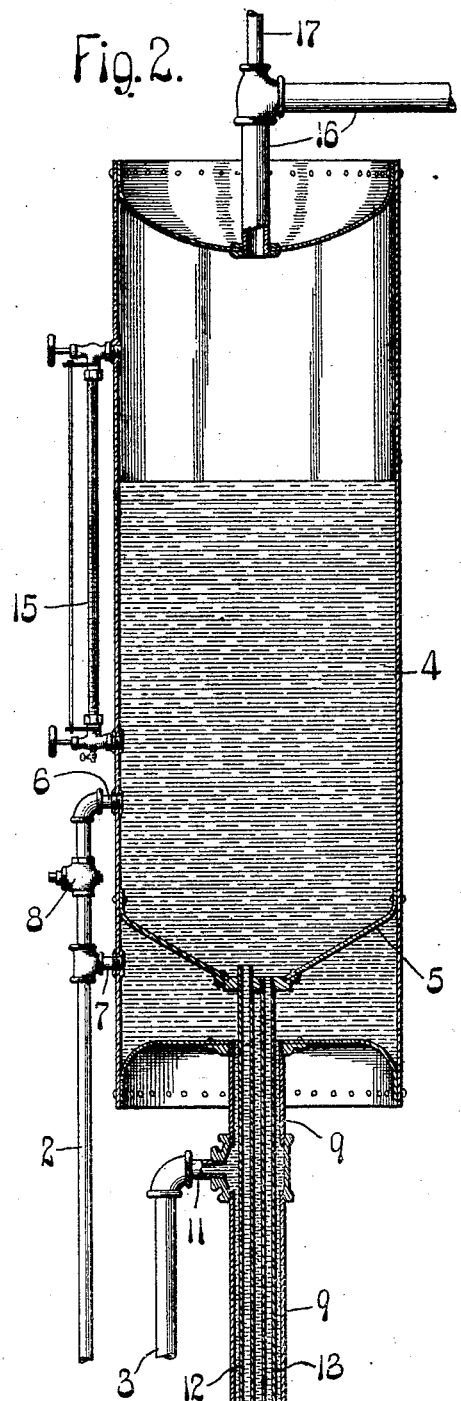
Figure 3:
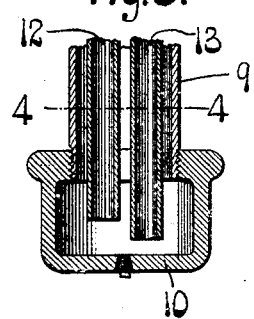
Figure 4:
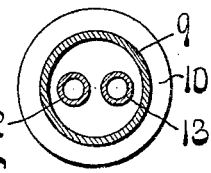

Figure 1 is a diagrammatic view of a hot water heating system embodying the features of my invention; Fig. 2 is a vertical sectional view of the expansion tank valve; Fig. 3 is an enlarged detail view of the parts shown at the lower end of Fig. 2; Fig. 4 is a horizontal sectional view taken on the line 4—4 of Fig. 3; and Fig. 5 is a view similar to Fig. 2 illustrating a modified form of my invention.

This invention relates to hot water heating apparatuses, and particularly to that type which have a relief valve consisting of a mercury seal that cuts off the water in the system from the water in the expansion tank.

One object of my invention is to provide a hot water heating apparatus having a relief valve which is so constructed that the mercury will always follow a certain path and return to its normal position when it is displaced by the pressure of the water in the system.

Another object of my invention is to provide a hot water heating apparatus having a relief valve arranged between the water circulating pipes of the system and the expansion tank, and means for cutting said valve out of service and establishing direct communication between the expansion tank and the circulating pipes of the system. And still another object of my invention is to provide a hot water heating apparatus having an expansion tank that is open to the atmoshpere, a mercury seal valve arranged between said tank and the circulating pipes of the system, and a heating chamber or compartment located adjacent to the expansion tank and adapted to receive the hot water that circulates through the pipes of the system so as to heat the contents of the expansion tank and prevent same from freezing.

Other objects and desirable features of my invention will be hereinafter pointed out.

In the drawings which illustrate the preferred form of my invention, 1 indicates a boiler to which a supply pipe 2 and a return pipe 3 are connected. A tank 4 is divided into two compartments by a funnel-shaped partition 5, the upper compartment constituting an expansion tank or chamber and the lower compartment a heating chamber through which the hot water in the system circulates. It will be obvious, however, that the heating compartment could be formed by a separate member instead of being formed by a portion of the tank 4. The supply pipe 2 is connected to said tank above and below the partition by means of branches 6 and 7, respectively.

By referring to Fig. 2 it will be seen that the pipe 2 forms a by-pass around the partition 5 and that this by-pass is provided with a cock 8.

9 indicates a receptacle or conduit which communicates with the lower compartment or heating chamber of the tank 4, the lower end of said conduit being detachably connected to a receptacle 10. A branch 11 leads from the conduit 9 to the return pipe 3.

12 and 13 indicate vertically arranged tubes which are secured to the partition 5 so as to communicate with the upper compartment or expansion chamber of the tank 4, and have their lower ends located in the receptacle 10, both the upper and lower ends of said tubes being preferably arranged in different horizontal planes.

When the system is in operation the cock 8 is closed and hot water passes from pipe 2 into the lower compartment of tank 4, thence into the conduit 9 and back to the boiler through the branch 11 and return pipe 3. As the water becomes heated it tends to expand and pass through the pipe or conduit 12 into the upper compartment or expansion chamber of tank 4, but it is prevented from doing so before it has reached a predetermined temperature by mercury 14 in the receptacle 10, which mercury must be forced below the lower end of tube 12 before the water can expand and enter said compartment. When the water exerts a certain pressure on the mercury, the latter rises in the tubes 12 and 13 and the water enters the lower end of tube 12 and thence passes into the upper compartment or expansion chamber of tank 4. As the water passes from the tube or conduit 12 into said expansion chamber it forces the mercury, which has risen in said tube, into the tank, and as the tube 12 projects above the partition 5 the mercury will return to the receptacle 10 by passing through tube 13, the end of which is flush with said partition.

In a relief valve of this construction the bulk of the mercury always rises in the tube 13 and the lower end of said tube remains sealed because the pressure in the receptacle or conduit 9 is relieved as soon as the mercury has been displaced from the lower end of the tube 12 which is in a higher horizontal plane than the lower end of the tube 13. The mercury that is forced upwardly and out of the upper end of the tube 12 will never tend to return through said tube to its normal position in the receptacle 10 for gravity causes said mercury to fall into the upper end of the tube 13 which is in a lower horizontal plane than the upper end of the tube 12. Consequently, in an apparatus of this construction the mercury always follows a certain path and never interferes with or impedes the flow of the water that is escaping into the expansion tank.

The upper compartment or expansion chamber of the tank 4 is preferably equipped with a water gage 15 and an overflow conduit 16, the latter being provided with a vent pipe 17 that leads to the atmosphere so as to prevent a siphon action which the overflowing water would tend to cause.

It will be readily understood that the water of a hot water heating system equipped with the apparatus herein shown can be maintained at a temperature above boiling point, and that this temperature will vary with the quantity of mercury in the removable receptacle 10. When the water which has been heated is allowed to cool it contracts and thereby creates a suction which causes the water that has passed into the expansion chamber to return to the system by passing through the mercury seal 14.

Prior to this invention serious accidents have been caused by water freezing in the expansion tank of hot water heating systems, but this danger is entirely eliminated by the apparatus shown in Fig. 2. In this apparatus hot water circulates through the lower compartment or heating chamber of tank 4 whenever a circulation is started in the pipes 2 and 3, and this hot water heats the contents of the upper compartment or expansion chamber and thus prevents it from freezing.

Another novel feature of the invention herein described is the means whereby I am able to establish direct communication between the pipe 2 that leads from the water circulating pipes of the system and the expansion tank so that the water will not have to pass into the conduit 9, break the mercury seal, and then pass up through the tube 12 into the expansion tank. One advantage of constructing the apparatus in this manner is that I can convert it into an apparatus in which the water in the system can flow into the expansion tank when only a low pressure has been obtained. Another advantage is that I can establish communication between the water circulating pipes and the atmosphere when the system is being filled with water or when the water is being drawn off. The means herein shown for accomplishing this consists of the pipe 2 and branches 6 and 7 which form a by-pass around the partition 5 in tank 4, said by-pass being provided with a cock 8, as previously stated.

When it is desired to fill the system with water or draw off the water, the cock 8 is opened. When the system is operating with the cock 8 open, the water is maintained at a comparatively low temperature as it is free to expand directly into the expansion chamber instead of being compelled to pass through the mercury seal.

In Fig. 5 I have shown a slightly modified form of the apparatus shown in Fig. 2. In this form the tank or expansion chamber $4^a$ is a single compartment. A by-pass 18, provided with a cock $8^a$, connects the tank $4^a$ to the conduit $9^a$. 23 indicates a pipe, which I term the expansion pipe, leading from the by-pass 18 to the heating system. With the exception of the elements just described this apparatus is substantially the same as the apparatus shown in Fig. 2, and it is therefore thought that its operation will be clearly understood without further description.

Having thus described the invention, what is claimed as new and desired to be secured by Letters Patent is:

1. In an apparatus of the character described, an expansion tank, a heating chamber of less capacity than the expansion tank and arranged adjacent thereto, means adapted to form communication between the heating chamber and the circulating pipes of the system so as to allow the heating medium to circulate through it continuously, a hollow tubular-shaped member arranged outside of the heating chamber and having its upper end communicating with said heating chamber, the lower end of said tubular-shaped member being closed, a mass of mercury in the lower end of said member, and a pair of tubes communicating with the expansion tank and having their lower ends normally closed by said mass of mercury; substantially as described.

2. In an apparatus of the character described, a tank, a pair of tubes, the upper ends of which lead into said tank, a closed receptacle containing mercury, the lower ends of said tubes being located in the mercury, both the upper and lower ends of said tubes being arranged in different horizontal planes, a conduit for conveying the water of a hot water heating system to said mercury receptacle so as to cause the pressure exerted by said water to force the mercury into one of said tubes and thereby allow the water to pass into said tank, a by-pass for allowing said water to pass into the tank without operating the mercury seal, and means for opening and closing said by-pass; substantially as described.

3. In an apparatus of the character described, a tank, a pair of tubes, the upper ends of which lead into said tank, a closed receptacle containing mercury, the lower ends of said tubes being located in the mercury, both the lower and upper ends of said tubes being arranged in different horizontal planes, a conduit for conveying the water of a hot water heating system to said mercury receptacle so as to cause the pressure exerted by said water to force the mercury into one of said tubes and thereby allow the water to pass into said tank, and means for rendering the mercury seal ineffective and allowing said water to pass directly into the tank; substantially as described.

4. In an apparatus of the character described, a tank provided with a partition that divides it into an upper and a lower compartment, said lower compartment constituting a heating chamber, a pair of tubes passing through said partition and having a water-tight fit with same so as to communicate with the upper compartment, a conduit arranged outside of the tank and communicating with the lower compartment, or heating chamber, said conduit surrounding said tubes, a receptacle connected to the lower end of said conduit and containing mercury into which the lower ends of said tubes project, and means for allowing the water of a hot water heating system to circulate through said conduit and said lower compartment; substantially as described.

5. In an apparatus of the character described, a tank divided into two compartments, one of which constitutes an expansion chamber, the other compartment constituting a heating chamber and being of less capacity than the expansion chamber, said heating chamber having means for connecting it to a hot water heating system so as to allow hot water to circulate therein continuously, a pair of tubes passing through the heating chamber and projecting into the expansion chamber, both the upper and lower ends of said tubes being arranged in different horizontal planes, a receptacle containing mercury in which the lower ends of said tubes are immersed, and a conduit which surrounds said tubes leading from the mercury receptacle to the heating chamber; substantially as described.

6. In an apparatus of the character described, a tank divided into two compartments, one of which constitutes an expansion chamber, the other compartment being provided with means for connecting it to a hot water heating system so as to allow hot water to circulate therein continuously, a pair of tubes passing through the heating chamber and communicating with the expansion chamber, both the upper and lower ends of said tubes being arranged in different horizontal planes, a receptacle containing mercury, a conduit which surrounds said tubes leading from the mercury receptacle to the heating chamber, a by-pass for establishing communication between the heating system and the expansion chamber, and means for opening and closing said by-pass; substantially as described.

7. A hot water heating apparatus provided with a pipe that is adapted to be connected to the circulating pipes of the system, an expansion tank, a valve arranged between said expansion tank and pipe and provided with a mass of mercury that is adapted to be displaced by the expansion of the water in the system so that said water can pass into the expansion tank, and means for cutting said valve out of service and establishing direct communication between said expansion tank and said pipe; substantially as described.

8. A hot water heating apparatus provided with an expansion tank, a pipe that is adapted to communicate with the circulating pipes of the system, a mercury valve arranged between said tank and pipe for preventing the water in the system from flowing into said tank until a certain pressure has been obtained, and a by-pass leading from said pipe to said expansion tank for cutting the mercury valve out of service and establishing direct communication between said pipe and tank; substantially as described.

9. A hot water heating apparatus provided with an expansion tank, a pipe that is adapted to communicate with the circulating pipes of the system, a closed receptacle connected to said pipes and adapted to receive water therefrom, a conduit leading from the lower end of said receptacle to said expansion tank, a quantity of mercury in said receptacle which normally closes the lower end of said conduit, a tube in said receptacle for receiving the mercury that is displaced when the water in said receptacle expands, a branch leading from said pipe to said expansion tank, and a valve for cutting off the flow of water through said branch; substantially as described.

10. In a hot water heating apparatus the combination of the circulating pipes, an expansion tank in communication with said pipes, and a pressure resisting valve arranged to be opened by the abnormal pressure of the water in the circulating pipes and to permit the excess of water to pass into said expansion tank, and means for cutting said valve out of service and establishing direct communication between said circulating pipes and said expansion tank.

In testimony whereof I hereunto affix my signature in the presence of two witnesses, this twenty-seventh day of July 1908.

OTTO OSTER.

Witnesses:
WELLS L. CHURCH,
GEORGE BAKEWELL.